United States Patent [19]

Kimura

[11] Patent Number: 4,723,074
[45] Date of Patent: Feb. 2, 1988

[54] RADIATION IMAGE RECORDING AND READ-OUT APPARATUS

[75] Inventor: Tsutomu Kimura, Kaisei, Japan

[73] Assignee: Fuji Photo Film Co., Ltd., Japan

[21] Appl. No.: 887,657

[22] Filed: Jul. 21, 1986

[30] Foreign Application Priority Data

Jul. 24, 1985 [JP] Japan ................................ 60-163697

[51] Int. Cl.$^4$ ............................................. G01T 1/105
[52] U.S. Cl. .................................. 250/327.2; 414/283
[58] Field of Search .......................... 250/327.2, 484.1;
271/268, 298; 414/277, 280, 281, 282, 283, 331, 618, 622, 751, 753

[56] References Cited

U.S. PATENT DOCUMENTS

| | | | |
|---|---|---|---|
| 3,212,649 | 10/1965 | Johnson et al. | 414/618 |
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/515 |
| 4,387,428 | 6/1983 | Ishida et al. | 364/414 |
| 4,400,619 | 8/1983 | Kotera et al. | 250/327.2 |

FOREIGN PATENT DOCUMENTS

0011395 2/1981 Japan ................................ 250/327.2

Primary Examiner—Janice A. Howell
Assistant Examiner—Constantine Hannaher
Attorney, Agent, or Firm—Gerald J. Ferguson, Jr.; Michael P. Hoffman; Michael J. Foycik, Jr.

[57] ABSTRACT

A radiation image recording and read-out apparatus comprises a sheet storing section for storing many stimulable phosphor sheets, a section for recording a radiation image on stimulable phosphor sheets, a section for reading out the radiation image by exposing the stimulable phosphor sheets to stimulating rays, and an erasing section for releasing residual radiation energy from the stimulable phosphor sheets. The apparatus also comprises a sheet conveyance system provided with a sheet holding mechanism for holding stimulable phosphor sheets transferably with respect to the sheet storing section, the image recording section, the image read-out section, and the erasing section. The sheet conveyance system moves the sheet holding mechanism in a arbitrary sequence among these sections.

6 Claims, 5 Drawing Figures

RADIATION IMAGE RECORDING AND READ-OUT APPARATUS

BACKGROUND OF THE INVENTION

1. Field of the Invention

The invention relates to a radiation image recording and read-out apparatus for exposing stimulable phosphor sheets respectively to a radiation passing through an object to have a radiation image of the object stored thereon, exposing the respective stimulable phosphor sheets to stimulating rays which cause them to emit light in proportion to the stored radiation energy, and detecting and converting the emitted light into electric signals. This invention particularly relates to a radiation image recording and read-out apparatus in which the stimulable phosphor sheets are reused for radiation image recording.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428, and Japanese Unexamined Patent Publication No. 56(1981)-11395, it has been proposed to use a stimulable phosphor in a radiation image recording and reproducing system. Specifically, a sheet comprising the stimulable phosphor (hereinafter referred to as a stimulable phosphor sheet) is first exposed to a radiation passing through an object to have a radiation image stored therein, and is then scanned with stimulating rays which cause it to emit light in proportion to the radiation energy stored. The light emitted from the stimulable phosphor sheet when the sheet is exposed to the stimulating rays is photoelectrically detected and converted to an electric image signal, which is processed as desired to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom in a final recording medium. For economical reasons, therefore, it is desirable that the stimulable phosphor sheet be used repeatedly.

Further, in a mobile X-ray diagnostic station such as a traveling X-ray diagnostic station in the form of a vehicle like a bus which is provided with a radiation image recording and read-out apparatus for use in the aforesaid radiation image recording and reproducing system and moves from place to place to record radiation images for mass medical examinations, it is disadvantageous to load the mobile X-ray diagnostic station with a large number of stimulable phosphor sheets, and the number of the stimulable phosphor sheets which can be loaded on the mobile X-ray diagnostic station is limited. Therefore, it is desired to load the mobile X-ray diagnostic station with stimulable phosphor sheets which can be used repeatedly, store the radiation images of the objects first in the stimulable phosphor sheets, transfer the electric image signals read out from the stimulable phosphor sheets into a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examination. This is very advantageous in practical use.

In order to reuse stimulable phosphor sheets as described above, the radiation energy remaining in the stimulable phosphor sheet after it is scanned with stimulating rays to read out the radiation image stored therein should be erased by exposure to light or heat as described, for example, in Japanese Unexamined Patent Publication No. 56(1981)-12599 or U.S. Pat. No. 4,400,619. The stimulable phosphor sheet should then be used again for radiation image recording.

From the aforesaid viewpoint, the applicant proposed in Japanese Unexamined Patent Publication No. 59(1984)-192240 a built-in type radiation image recording and read-out apparatus comprising:

(i) a circulating and conveying means for conveying at least one stimulable phosphor sheet for recording a radiation image thereon along a predetermined circulation path, (ii) an image recording section positioned on said circulation path for recording a radiation transmission image of an object on said stimulable phosphor sheet by exposing said stimulable phosphor sheet to a radiation passing through said object, (iii) an image read-out section positioned on said circulation path and provided with a stimulating ray source for emitting stimulating rays for scanning said stimulable phosphor sheet carrying said radiation image stored therein in said image recording section, and a photoelectric read-out means for detecting light emitted from said stimulable phosphor sheet scanned with said stimulating rays to obtain an electric image signal, and (iv) an erasing section for, prior to the next image recording on said stimulable phosphor sheet for which the image read-out has been conducted in said image read-out section, having said stimulable phosphor sheet release the radiation energy remaining in said stimulable phosphor sheet, whereby said stimulable phosphor sheet is circulated through said image recording section, said image read-out section and said erasing section and reused for radiation image recording. With the radiation image recording and read-out apparatus of this type, it is possible to conduct radiation image recording and read-out continuously and efficiently.

In the aforesaid radiation image recording and read-out apparatus, for example, when it is found that the radiation image recording at the image recording section was incorrect, it is desired to send the stimulable phosphor sheet, which was subjected to the radiation image recording, directly to the erasing section without conducting image readout to erase the stored radiation energy, thereby quickly making the sheet reusable for image recording. Also, when there are stimulable phosphor sheets on which image recording has been conducted but image read-out has not been carried out, it is often desired to conduct urgent image recording and read-out on a stimulable phosphor sheet preferentially to the aforesaid stimulable phosphor sheets and quickly observe the radiation image. Further, in the case where a stimulable phosphor sheet is left to stand for long periods without being used for radiation image recording after erasing at the erasing section, i.e. releasing of residual radiation energy, is carried out on the sheet, the sheet may store radiation energy constituting a noise component caused by floating-off of residual image or the like. Therefore, in such a case, instead of directly using the stimulable phosphor sheet for the next radiation image recording, it is desired to send the stimulable phosphor sheet to the erasing section to carry out erasing (secondary erasing) and make it reusable for the next radiation image recording.

However, with the aforesaid radiation image recording and read-out apparatus, since the image recording section, the image read-out section, and the erasing section are positioned along the sheet circulation path, the stimulable phosphor sheet must be sequentially passed through the respective sections for returning to the erasing section even though the radiation image recording and/or read-out should be skipped for the sheet. Therefore, a long time is taken for the sheet circulation, and the waiting time becomes long. Also, since processing is possible only in the image recording sequence, it is not possible to conduct urgent processing preferentially.

SUMMARY OF THE INVENTION

The primary object of the present invention is to provide a radiation image recording and read-out apparatus wherein stimulable phosphor sheets are used repeatedly and an unnecessary step may be skipped.

Another object of the present invention is to provide a radiation image recording and read-out apparatus which increases the recording and read-out processing speed.

The present invention provides a radiation image recording and read-out apparatus comprising:

(i) a sheet storing section for storing a plurality of stimulable phosphor sheets capable of recording a radiation image thereon, (ii) an image recording section for recording a radiation image on each of said stimulable phosphor sheets by exposing said stimulable phosphor sheet to a radiation carrying image information, (iii) an image read-out section provided with a stimulating ray source for emitting stimulating rays for scanning said stimulable phosphor sheet carrying said radiation image recorded thereon at said image recording section, and a photoelectric read-out means for detecting light emitted from said stimulable phosphor sheet scanned with said stimulating rays to obtain an electric image signal, (iv) an erasing section for having said stimulable phosphor sheet release the radiation energy remaining on said stimulable phosphor sheet prior to the next image recording on said stimulable phosphor sheet for which the image read-out has been conducted at said image read-out section, and (v) a sheet conveyance means provided with a sheet holding mechanism for holding said stimulable phosphor sheet transferably with respect to said sheet storing section, said image recording section, said image read-out section, and said erasing section, said sheet conveyance means moving said sheet holding mechanism in an arbitrary sequence among said sections.

In the radiation image recording and read-out apparatus of the present invention, since the stimulable phosphor sheet is conveyed by the sheet conveyance means which moves the sheet holding mechanism for holding the stimulable phosphor sheet in an arbitrary sequence among the sheet storing section, the image recording section, the image read-out section, and the erasing section, it is possible to convey the stimulable phosphor sheet without passing it through an unnecessary section or sections among said sections, and to change the processing sequence of stimulable phosphor sheets. Therefore, it becomes possible to increase the recording and read-out processing speed. Further, since the stimulable phosphor sheet is held by the sheet holding mechanism of the sheet conveyance means and conveyed as described above, the stimulable phosphor sheet is free from scratching and generation of static electricity, and the service life of the sheet becomes longer than with an apparatus wherein the sheet is conveyed and circulated by belt conveyors, conveyor rollers or the like connecting the aforesaid sections.

DESCRIPTION OF THE PREFERRED EMBODIMENTS

The present invention will hereinbelow be described in further detail with reference to the accompanying drawings.

Figure 1:
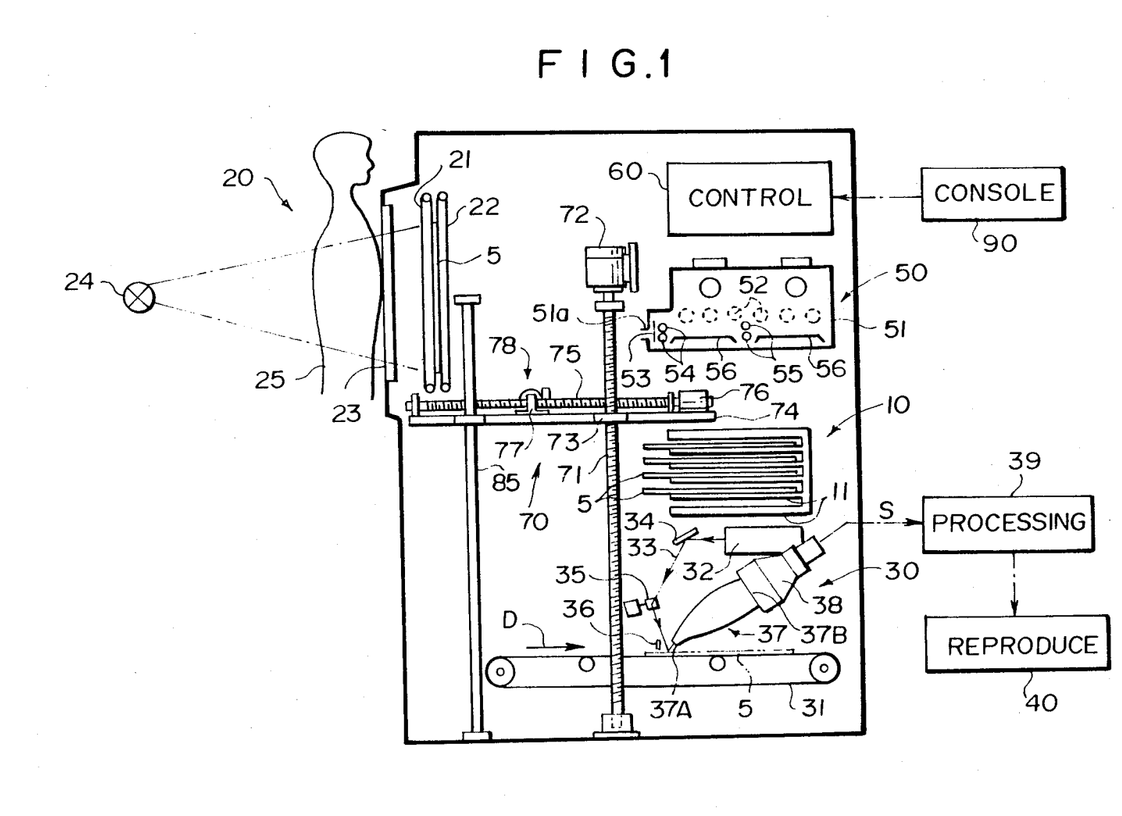
FIG. 1 is a schematic side view showing an embodiment of the radiation image recording and read-out apparatus in accordance with the present invention.

Referring to FIG. 1, the radiation image recording and read-out apparatus comprises a sheet storing section 10, an image recording section 20, an image read-out section 30, an erasing section 50, a control section 60, and a sheet conveyance means 70.

Figure 2:
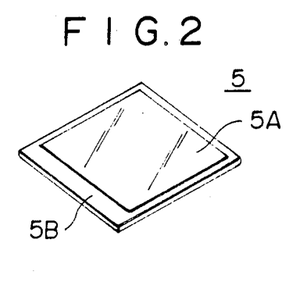
FIG. 2 is a perspective view showing the stimulable phosphor sheet used in the embodiment of FIG. 1, FIGS. 3 and 4 are a perspective view and a side view showing a part of the embodiment of FIG. 1.

The sheet storing section 10 is provided with a plurality of horizontal rack plates 11, 11, ... (by way of example, five rack plates in this embodiment). Stimulable phosphor sheets 5, 5, ... are respectively stored on the rack plates 11, 11, .... As shown in FIG. 2, each of the stimulable phosphor sheets 5, 5, ... comprises a reinforcement plate 5B, and a stimulable phosphor sheet body 5A secured to the reinforcement plate 5B, for example, by adhesion. Strictly speaking, the stimulable phosphor sheet refers to the sheet body 5A. However, for simplicity of explanation in this specification, the combination of the sheet body 5A with the reinforcement plate 5B is referred to as the stimulable phosphor sheet. As shown in FIG. 1, the stimulable phosphor sheet 5 is placed on the rack plate 11 with one end portion (the left end portion of the reinforcement plate 5B in FIG. 2) protruded from the rack plate 11.

The image recording section 20 is provided with endless belts 21 and 22 for conveying the stimulable phosphor sheet 5 by sandwiching it therebetween and holding it at the image recording position. The image recording section 20 also comprises an image recording stand 23 positioned to face the stimulable phosphor sheet 5 held between the endless belts 21 and 22, and a radiation source 24 constituted by an X-ray tube or the like positioned to face the image recording stand 23 in spaced relation thereto.

The image read-out section 30 is provided with an endless belt 31 positioned at the lower section for conveying the stimulable phosphor sheet 5 in the direction as indicated by the arrow D of FIG. 1 up to a predetermined read-out position, i.e. the main scanning position of a laser beam as described later, and moving the stimulable phosphor sheet 5 at a predetermined speed in a sub-scanning direction as indicated by the arrow D approximately normal to the main scanning direction of the laser beam at the read-out position. Above the endless belt 31 are positioned a laser beam source 32, and a mirror 34 and a galvanometer mirror 35 for scanning a laser beam 33 emitted by the laser beam source 32 in the width direction of the stimulable phosphor sheet 5 on the endless belt 31. The laser beam 33 is made by reciprocal swinging of the galvanometer mirror 35 to scan the stimulable phosphor sheet 5 carrying a radiation image recorded thereon in the main scanning direction. A light guiding reflection mirror 36 and a light guide member 37 are positioned along the main scanning line at the scanning position of the laser beam 33 on the sheet 5. When the sheet 5 is exposed to the laser beam 33, the sheet 5 emits light in proportion to the stored radiation energy. The light emitted by the sheet 5 towards the light guide member 37 and the light emitted by the sheet 5 and reflected by the light guiding reflection mirror 36 enters the light guide member 37 from its light input face 37A, is guided inside of the light guide member 37 through total reflection, and is detected by a photomultiplier 38 closely contacted with a light output face 37B of the light guide member 37. Thus the light emitted by the sheet 5 is photoelectrically detected by the photomultiplier 38. The sheet 5 is moved in the sub-scanning direction as mentioned above simultaneously with the scanning with the laser beam 33 in the main scanning direction, and therefore the radiation image recorded on the sheet 5 is read out over the whole surface thereof. An output signal (read-out image signal) S generated by the photomultiplier 38 and representing the radiation image is sent to an image processing circuit 39 for conducting necessary image processing, and then sent to an image reproducing apparatus 40. As mentioned above, the image reproducing apparatus 40 may be a display such as a CRT, or an apparatus for recording the image on a photographic film by scanning with light, or may be replaced by an apparatus for storing the electric image signal on a recording device such as a magnetic tape.

The erasing section 50 is constituted by a case 51 fabricated of a light shielding material and having a slitlike opening 51a positioned at a part of the erasing section 50 (at the left lower section in FIG. 1) for introduction and removal of the stimulable phosphor sheet 5 from the erasing section 50. The erasing section 50 also comprises a plurality of erasing light sources 52, 52, . . . constituted by fluorescent lamps, halogen lamps, tungsten-filament lamps, xenon lamps or the like positioned inside of the case 51 for emitting mainly light having a wavelength within the stimulation wavelength range for the stimulable phosphor constituting the sheet 5. Further, the erasing section 50 is provided with a shutter 53 positioned to face the opening 51a for opening and closing it, a pair of rollers 54, a pair of rollers 55 and guide plates 56, 56 for conveying the sheet 5 inserted through the opening 51a into the case 51.

Figure 3:
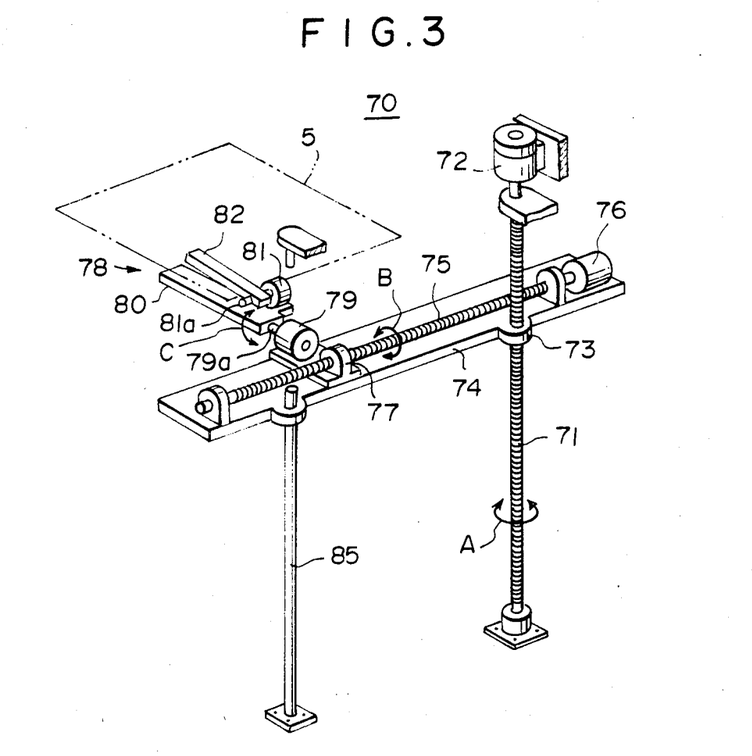

As shown in detail in FIG. 3, the sheet conveyance means 70 comprises a screw rod 71 positioned vertically for rotation around the longitudinal axis, i.e. in the direction as indicated by the arrow A, a motor 72 for rotating the screw rod 71, and a vertically moveable base 74 having a nut section or a female screw section 73 meshed with the screw rod 71 and moveable along the screw rod 71 and a guide rod 85. The sheet conveyance means 70 also comprises a screw rod 75 horizontally placed on the vertically moveable base 74 and supported rotatably around the longitudinal axis, i.e. in the direction as indicated by the arrow B, a motor 76 for rotating the screw rod 75, and a sheet holding mechanism 78 having a nut section 77 meshed with the screw rod 75. The screw rod 71 is positioned on the lateral side with respect to the sheet storing section 10, the image recording section 20, the image read-out section 30 and the erasing section 50, i.e. on the forward side as viewed in the direction normal to the drawing sheet in FIG. 1. Therefore, when the motor 72 is driven to rotate the screw rod 71, the reinforcement plate 5B moves vertically on the lateral side with respect to the aforesaid sections 10, 20, 30 and 50. Also, when the motor 76 is driven and the screw rod 75 is rotated, the sheet holding mechanism 78 moves horizontally.

The sheet holding mechanism 78 comprises a rotary solenoid 79 secured to the nut section 77, a holding plate 80 secured to a rotation shaft 79a of the rotary solenoid 79, a rotary solenoid 81 mounted on the holding plate 80, and an arm 82 secured to a rotation shaft 81a of the rotary solenoid 81.

The control section 60 receives inputs from a group of sensors (not shown) and an instruction specified from a console 90 or the like, and controls the operations of the endless belts 21, 22 at the image recording section 20, the endless belt 31 at the image read-out section 30, the laser beam source 32, the galvanometer mirror 35, the erasing light sources 52, 52, . . . at the erasing section 50, the shutter 53 and the nip rollers 54, 55 at the erasing section 50, and the motors 72, 76 and the rotary solenoids 79, 81 of the sheet conveyance means 70. The console 90 is provided with switches for carrying out the radiation image recording, and manual conveyance switches indicated, for example, as "storing section", "recording section", "read-out section" and "erasing section" for manually conveying the stimulable phosphor sheet to the sheet storing section 10, the image recording section 20, the image read-out section 30, and the erasing section 50.

The aforesaid embodiment of the radiation image recording and read-out apparatus in accordance with the present invention is operated as described below. When the normal radiation image recording is conducted, the motor 72 is rotated by a predetermined amount by the instruction specified, for example, by the console 90 connected to the control section 60, and the vertically moveable base 74 is moved to a predetermined vertical position on the lateral side with respect to the sheet storing section 10. Then, the motor 76 is rotated by a predetermined amount, and the sheet holding mechanism 78 is moved rightwardly from the position leftwardly spaced from the sheet storing section 10 in FIG. 1 until the holding plate 80 comes to a position under the portion of a predetermined stimulable phosphor sheet 5 protruded from the rack 11, i.e. the left end portion of the stimulable phosphor sheet 5 in FIG. 2. (At this time, the arm 82 is positioned so that its end is upwardly spaced from the holding plate 80.) Thereafter, the rotary solenoid 81 is driven, and the arm 82 is rotated so that its end moves toward the holding plate 80. As a result, the end portion of the stimulable phosphor sheet 5, i.e. the portion of the reinforcement plate 5B, is grasped between the arm 82 and the holding plate 80. In this condition, the motor 76 is rotated reversely to move the sheet holding mechanism 78 leftwardly in FIG. 1, and the grasped stimulable phosphor sheet 5 is taken out of the sheet storing section 10. After the stimulable phosphor sheet 5 is completely removed from the sheet storing section 10, the rotation shaft 79a of the rotary solenoid 79 is rotated by 90° in the direction as indicated by the arrow C in FIG. 3, and the stimulable phosphor sheet 5 is turned upright so that the right end of the sheet 5 in the horizontal position as shown in FIG. 3 becomes the upper end. At the same time, the motor 72 is rotated to move the vertically moveable base 74 down to a predetermined position where the upper end of the stimulable phosphor sheet 5 is positioned below the endless belts 21 and 22 at the image recording section 20. The motor 76 is then operated to move the sheet holding mechanism 78 leftwardly so that the upper end of the stimulable phosphor sheet 5 comes just between the endless belts 21 and 22. In this condition, the motor 72 is rotated to move up the vertically moveable base 74 so that the upper end of the stimulable phosphor sheet 5 held by the sheet holding mechanism 78 is inserted between the endless belts 21 and 22. The insertion of the upper end of the stimulable phosphor sheet 5 between the endless belts 21 and 22 is detected, for example, by a photoelectric sensor (not shown), and the detection signal is input to the control section 60. When the control section 60 receives the detection signal, the motor 72 is stopped, and the movement of the vertically moveable base 74 is stopped. At the same time, the rotary solenoid 81 is operated reversely, and the arm 82 is rotated so that its end moves away from the holding plate 80, and holding of the stimulable phosphor sheet 5 between the holding plate 80 and the arm 82 is released. At the same time, a drive motor (not shown) for the endless belts 21 and 22 is operated under control by the control section 60, and the stimulable phosphor sheet 5 is pulled up between the endless belts 21 and 22 away from the sheet holding mechanism 78. After the stimulable phosphor sheet 5 is pulled up to a predetermined vertical position, i.e. the position shown in FIG. 1, the drive motor for the endless belts 21 and 22 is stopped.

Thereafter, an object 25 is placed in front of the image recording stand 23, and the radiation source 24 is activated. The energy of the radiation passing through the object 25 is stored on the stimulable phosphor sheet 5, and a radiation image of the object 25 is recorded on the sheet 5.

When the radiation image recording is finished, the endless belts 21, 22 and the rotary solenoid 81 are operated in the sequence and direction reverse to the aforesaid ones, and the stimulable phosphor sheet 5 carrying the radiation image recorded thereon is grasped between the holding plate 80 and the arm 82 of the sheet holding mechanism 78. The motor 72 is then operated to move down the sheet holding mechanism 78. When the upper end of the sheet 5 is separated from the endless belts 21 and 22, the rotation shaft 79a of the rotary solenoid 79 is rotated by 90° reversely, i.e. clockwise as indicated by the arrow C in FIG. 3, and the sheet 5 is held horizontally. The motor 72 continues to be operated, and the sheet holding mechanism 78 moves down.

Figure 4:
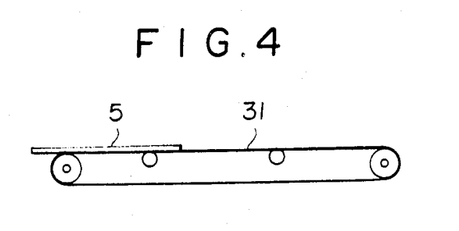

At the same time the motor 76 is operated to move the sheet holding mechanism 78 rightwardly in FIG. 1 by a predetermined distance. The motor 72 is stopped when the stimulable phosphor sheet 5 is placed as shown in FIG. 4 on the endless belt 31 positioned horizontally at the image read-out section 30 at the lower section of the apparatus. When the motor 72 is thus stopped, the rotary solenoid 81 is operated to move the arm 82 in the direction for releasing the holding of the stimulable phosphor sheet 5. In this case, too, the stoppage of the motor 72 and activation of the rotary solenoid 81 are controlled by the control section 60 based on a sensor or the like for detecting the stimulable phosphor sheet 5 placed on the endless belt 31. The position of the sheet holding mechanism 78 in the longitudinal direction of the screw rod 75 when the stimulable phosphor sheet 5 is placed on the endless belt 31 is adjusted so that, as shown in FIG. 4, the left end portion, i.e. the end portion held by the arm 82, of the sheet 5 is slightly protruded from the endless belt 31. Therefore, it is possible for the sheet holding mechanism 78 to transfer the stimulable phosphor sheet 5 onto the endless belt 31 without coming into contact with the endless belt 31.

After the stimulable phosphor sheet 5 is transferred from the sheet holding mechanism 78 onto the endless belt 31, the endless belt 31 is rotated in the direction as indicated by the arrow D of FIG. 1, and the sheet 5 is moved up to a predetermined read-out position. The laser beam source 32 and the galvanometer mirror 35 are then activated, and the sheet 5 is scanned with the laser beam 33 in the main scanning direction. At the same time, the sheet 5 is conveyed by the endless belt 31 in the sub-scanning direction as indicated by the arrow D approximately normal to the main scanning direction. As a result, the radiation image recorded on the sheet 5 is photoelectrically read out by the photomultiplier 38 over the whole surface of the sheet 5. The output signal (read-out image signal) S generated by the photomultiplier 38 and representing the radiation image is sent to the image processing circuit 39 which conducts necessary image processing, and the processed signal is sent to the image reproducing apparatus 40.

After the image read-out is finished as described above, the endless belt 31 is rotated reversely to return the stimulable phosphor sheet 5 to the position shown in FIG. 4, i.e. the position at which the sheet 5 was transferred from the sheet holding mechanism 78 onto the endless belt 31, and is then stopped. Then, the rotary solenoid 81 is operated so that the end of the arm 82 moves towards the holding plate 80, and the end portion of the stimulable phosphor sheet 5 protruded leftwardly from the endless belt 31 as shown in FIG. 4 is grasped between the arm 82 and the holding plate 80.

In the case where an instruction for the next radiation image recording is given by the console 90 or the like after the first stimulable phosphor sheet 5 is transferred onto the endless belt 31 at the image read-out section 30, the sheet holding mechanism 78 is returned to the sheet storing section 10, a second stimulable phosphor sheet 5 is fed to the image recording section 20 in the same manner as described above, and radiation image recording is conducted on the second stimulable phosphor sheet 5 at the image recording section 20. Then, the second stimulable phosphor sheet 5 carrying the radiation image recorded thereon is returned to the sheet storing section 10 by the sheet conveyance means 70 in the same manner as the operation for storing the stimulable phosphor sheet 5 to the sheet storing section 10 as will be described later, and the apparatus waits for completion of the image read-out from the first stimulable phosphor sheet 5. Therefore, in this case, the sheet holding mechanism 78 is returned from the sheet storing section 10 to the image read-out section 30 for holding the first stimulable phosphor sheet 5 for which the image read-out has been finished, and holds the end portion of the first stimulable phosphor sheet 5 on the endless belt 31 by the holding plate 80 and the arm 82.

After the stimulable phosphor sheet 5 is held by the sheet holding mechanism 78 as mentioned above, the motor 72 is operated to move up the vertically moveable base 74 and the sheet holding mechanism 78. The motor 72 is stopped when the stimulable phosphor sheet 5 held by the sheet holding mechanism 78 moves up to the predetermined height facing the nip rollers 54, 54 at the erasing section 50. At this time, the shutter 53 is opened, and the motor 76 of the sheet conveyance means 70 is rotated to move the sheet holding mechanism 78 rightwardly in FIG. 1. When the end portion of the stimulable phosphor sheet 5 is inserted between the nip rollers 54, 54, the motor 76 is stopped, and the rotary solenoid 81 is operated to rotate the arm 82 in the direction for releasing the holding of the sheet 5. Thereafter, the nip rollers 54, 55 are rotated to convey the sheet 5 into the case 51. When the stimulable phosphor sheet 5 is conveyed into the case 51, rotation of the nip rollers 54, 55 is stopped, and the shutter 53 is closed. The erasing light sources 52, 52, ... in the case 51 are turned on to release radiation energy remaining on the sheet 5. At this time, since the shutter 53 is closed, there is no risk of the erasing light leaking from the case 51 to the image read-out section 30 and causing noise in the read-out signal.

After the residual radiation energy (residual image) on the stimulable phosphor sheet 5 is erased to such an extent that the sheet 5 may be reused for radiation image recording, the erasing light sources 52, 52, . . . are turned off, the shutter 53 is opened, and the nip rollers 54, 55 are rotated reversely to remove the sheet 5 out of the case 51. When the stimulable phosphor sheet 5 is removed out of the case 51, the rotary solenoid 81 of the sheet holding mechanism 78 placed at the position where the sheet 5 was introduced into the case 51 is operated, and the arm 82 is moved towards the holding plate 80. Thus the end portion of the stimulable phosphor sheet 5 is grasped between the holding plate 80 and the arm 82. At the same time, the motor 76 is activated to move the sheet holding mechanism 78 leftwardly in FIG. 1, and the stimulable phosphor sheet 5 is completely removed from the erasing section 50. At this stage, the shutter 53 is closed.

In the case where the instruction for the next radiation image recording was given after the first stimulable phosphor sheet 5 was sent to the image read-out section 30, and the second stimulable phosphor sheet 5 carrying the radiation image recorded thereon was returned to the sheet storing section 10 as described above, the second sheet 5 is sent to the image read-out section 30 and image read-out is conducted on the second sheet in the same manner as described above while erasing for the first sheet 5 is conducted at the erasing section 50. Therefore, in this case, the sheet holding mechanism 78 moves from the erasing section 50 to the sheet storing section 10, grasps the second sheet 5 waiting at the sheet storing section 10, transfers the second sheet 5 onto the endless belt 31 at the image read-out section 30, and then returns to the erasing section 50.

After the stimulable phosphor sheet 5 is removed from the erasing section 50, the motor 76 is stopped, and the motor 72 is operated to move down the vertically moveable base 74 and the sheet holding mechanism 78. The motor 72 is stopped when the stimulable phosphor sheet 5 held horizontally by the sheet holding mechanism 78 reaches a position slightly above the rack plate 11 for the sheet 5. Then, the motor 76 is rotated by a predetermined amount, and the sheet holding mechanism 78 is moved by a predetermined distance rightwardly in FIG. 1. As a result, the stimulable phosphor sheet 5 held by the sheet holding mechanism 78 is positioned on the rack plate 11 so that the end portion grasped between the holding plate 80 and the arm 82 is slightly protruded from the rack 11. The rotary solenoid 81 is then activated to swing the arm 82 in the direction for releasing the grasping of the sheet 5. Also, the motor 72 is slightly operated to slightly move down the sheet holding mechanism 78, and at the same time the motor 76 is operated to move the sheet holding mechanism 78 leftwardly in FIG. 1. In this manner, the stimulable phosphor sheet 5 is transferred from the sheet holding mechanism 78 onto the rack 11, and stored at the sheet storing section 10. The sheet holding mechanism 78 moved away from the sheet storing section 10 is stopped in the vicinity of the sheet storing section 10, and made to wait for the next sheet removal. Or, in the case where the second stimulable phosphor sheet 5 was sent to the image read-out section 30, the sheet holding mechanism 78 is moved to the image read-out section 30 for conveying the sheet 5 to the erasing section 50.

The plurality of the stimulable phosphor sheets 5, 5, . . . may have the same sensitivity and size, i.e. the size of the stimulable phosphor sheet body 5A, or may have different sensitivities and/or sizes so that a sheet suitable for the image recording portion of the object 25 and/or the purpose of image recording may be selected. In the former case, the control section 60 should preferably be constituted so that the sheet conveyance means 70 sequentially takes the sheets 5, 5, . . . out of the racks 11, 11, . . . at the sheet storing section 10 to uniformly use the sheets 5, 5, . . . . In the latter case, it is possible to select a desired stimulable phosphor sheet 5 by entering a signal designating the sheet 5 from the console 90 to the control section 60, and constituting the control section 60 to control the operation of the sheet conveyance means 70, specifically the rotation amount of the motor 72, based on said signal at the time of sheet removal from the sheet storing section 10.

The aforesaid embodiment of the radiation image recording and read-out apparatus is operated as described above in the case where the stimulable phosphor sheet 5 is conveyed in the normal sequence of sheet storing section 10→image recording section 20→(sheet storing section 10→) image read-out section 30→erasing section 50→sheet storing section 10. However, the sheet holding mechanism 78 for holding the sheet 5 is moveable in any other sequence among the sections 10, 20, 30 and 50. For this purpose, a signal specifying the movement destination of the sheet holding mechanism 78, i.e. the section 10, 20, 30 or 50, is entered from the console 90 or the like to the control section 60 by pressing of the switch among the manual conveyance switches indicated as "storing section", "recording section", "read-out section" and "erasing section".

For example, in the case where the stimulable phosphor sheet 5 is fed to the image recording section 20 and radiation image recording is conducted in accordance with the normal sequence and it is found that the image recording is incorrect, the manual conveyance switch indicated as "erasing section" is pressed. In this case, after the stimulable phosphor sheet 5 is transferred from the endless belts 21, 22 to the sheet holding mechanism 78, the motors 72 and 76 of the sheet conveyance means 70 are operated to move the sheet holding mechanism 78 to the erasing section 50 under control by the control section 60. After the sheet holding mechanism 78 is moved to the erasing section 50, the stimulable phosphor sheet 5 is sent from the sheet holding mechanism 78 to the erasing section 50 and erased at the erasing section 50 in the same manner as the aforesaid normal sequence. When the manual conveyance is reset at this time, the erased stimulable phosphor sheet 5 is automatically sent to the sheet storing section 10 in the same manner as described above.

Also, in the case where the stimulable phosphor sheet 5 erased at the erasing section 50 and stored at the sheet storing section 10 has not been used for long periods, the sheet 5 may store radiation energy constituting noise as mentioned above. Therefore, in this case, the manual conveyance switches indicated as "storing section", "erasing section" and "recording section" are pressed in this order at the beginning of the operation of the apparatus. As a result, the motors 72 and 76 controlled by the control section 60 operate the sheet holding mechanism 78 to first move to the sheet storing section 10, take one stimulable phosphor sheet 5 out of the sheet storing section 10, send the sheet 5 to the erasing section 50 for releasing residual radiation energy, and then feed the sheet 5 to the image recording section 20. When the stimulable phosphor sheet 5 subjected to the erasing, i.e. the secondary erasing, is used for radiation image recording it is possible to obtain a reproduced visible image having a high image quality and free from noise caused by the residual radiation energy.

On the other hand, in the case where different types of stimulable phosphor sheets 5, 5, . . . are used as mentioned above, it may be desired to continuously use a specific sheet 5 suitable for the image recording portion of the object 25 and/or the purpose of image recording. In such a case, the manual conveyance switch indicated as "recording section" is pressed while the specific stimulable phosphor sheet 5 is subjected to erasing at the erasing section 50. As a result, the specific stimulable phosphor sheet 5 erased at the erasing section 50 is sent from the erasing section 50 directly to the image recording section 20 without passing through the sheet storing section 10, and it becomes possible to increase the speed of radiation image recording and read-out processing.

Also, it may be desired to urgently conduct radiation image recording on some stimulable phosphor sheets 5, 5, . . . before conducting image read-out for reasons of the object 25 or the like. In this case, the manual conveyance switches indicated as "recording section" and "storing section" are pressed alternately. It thereby becomes possible to conduct radiation image recording continuously on some stimulable phosphor sheets 5, 5, . . . while the stimulable phosphor sheet 5 for which the image recording has been finished is temporarily stored at the sheet storing section 10. Further, when diagnosis of a patient needs to be conducted preferentially after the aforesaid radiation image recording is carried out, the manual conveyance switches indicated as "recording section", "read-out section", "erasing section" and "storing section" are pressed in this sequence. The radiation image recording for the patient is conducted immediately on a new sheet 5, and image read-out for the sheet 5 is conducted at the image read-out section 30 in preference to the stimulable phosphor sheets 5, 5, . . . temporarily stored at the sheet storing section 10. The sheet 5 is then preferentially erased at the erasing section 50, and stored at the sheet storing section 10.

The aforesaid sequential operations specified by the manual switches on the console 90 may be automatically achieved by programming them with a microcomputer or the like at the control section 60.

Figure 5:
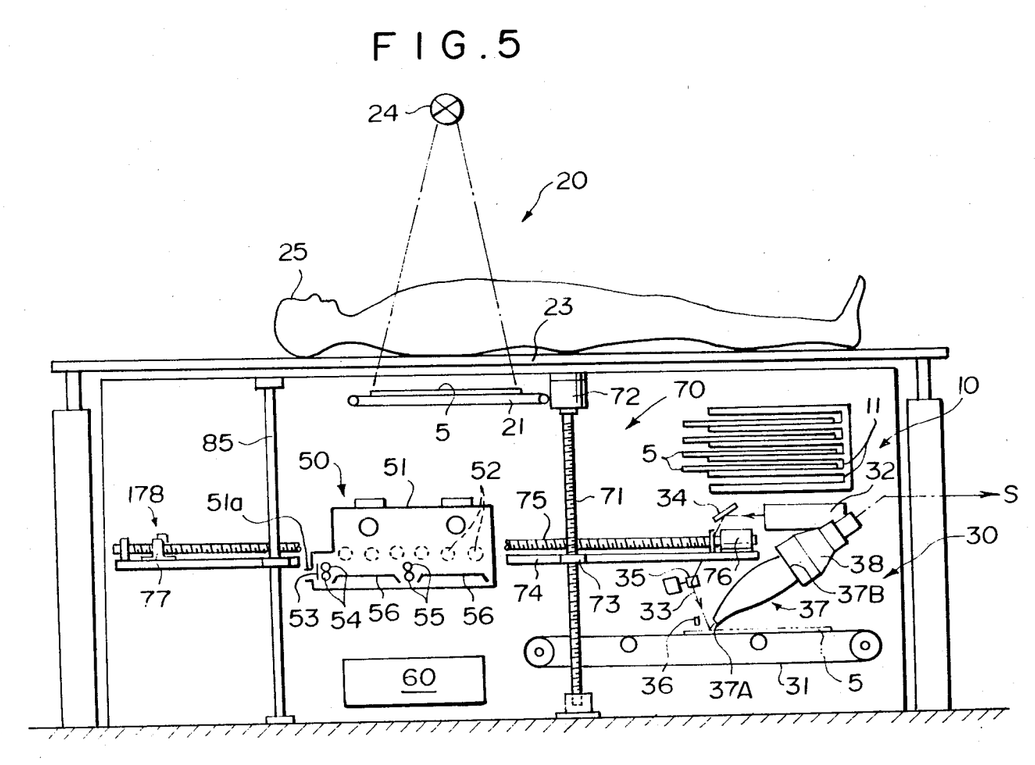
FIG. 5 is a schematic side view showing another embodiment of the radiation image recording and read-out apparatus in accordance with the present invention.

Another embodiment of the radiation image recording and read-out apparatus in accordance with the present invention will hereinbelow be described with reference to FIG. 5. In FIG. 5, similar elements are numbered with the same reference numerals with respect to FIGS. 1 to 4. In this embodiment, the image recording section 20 is formed as a bed type. At the image recording section 20, the stimulable phosphor sheet 5 is placed horizontally on the endless belt 21. Transferring of the sheet 5 between the endless belt 21 and a sheet holding mechanism 178 of the sheet conveyance means 70 is conducted in the same manner as the sheet transfer between the endless belt 31 at the image read-out section 30 and the sheet holding mechanism 178 (in the same manner as described above).

In the embodiment of FIG. 5, the posture of the sheet 5 need not be changed since it is held horizontally at the image recording section 20, the sheet storing section 10, the image read-out section 30 and the erasing section 50. Therefore, the sheet holding mechanism 178 of the sheet conveyance means 70 is formed by omitting the rotary solenoid 79 from the sheet holding mechanism 78 shown in FIG. 3. That is, the holding plate 80 is directly secured to the nut section 77.

The aforesaid embodiment are provided with the sheet conveyance means 70 for holding the stimulable phosphor sheet 5 by grasping it between the holding plate 80 and the arm 82. However, any other mechanism may be used for holding the stimulable phosphor sheet 5. For example, the stimulable phosphor sheet 5 may be held by suction by use of an air suction cup, or by four-point supporting from below the sheet 5.

Also, a sheet conveyance means constituted in the same manner as the sheet conveyance means 70 may be used additionally. In this case, it is possible to convey the sheet 5 more efficiently.

Further, instead of using the screw rods 71 and 75 in the sheet conveyance means 70, it is also possible to use chains, belts or the like for moving the vertically moveable base 74 and the sheet holding mechanism 78.

The stimulable phosphor sheet 5 is not limited to the one comprising the reinforcement plate 5B and the stimulable phosphor sheet body 5A secured to the reinforcement plate 5B. Thus the stimulable phosphor sheet 5 may be constituted only by the stimulable phosphor sheet body. In this case, for preventing a sheet conveyance failure, the stimulable phosphor sheet should be constituted by a rigid substrate and a stimulable phosphor laid on the substrate. In the case where the stimulable phosphor sheet 5 comprising the reinforcement plate 5B and the stimulable phosphor sheet body 5A secured to the reinforcement plate 5B is used as described above, a detent for positioning may be provided at a part of the reinforcement plate 5B, thereby improving the sheet positioning accuracy at the sheet storing section 10, the image recording section 20, the image read-out section 30, and the erasing section 50. Also, the reinforcement plate 5B may be provided with a magnet, and sheet holding at the image recording section 20 may be achieved by magnetic attraction of the magnet, thereby simplifying the sheet holding mechanism at the image recording section 20. Further, the reinforcement plate 5B may be provided with a bar code or the like indicating the type of the sheet (size, sensitivity or the like), and the bar code or the like may be used for sheet control in the apparatus.

At the image read-out section 30, image read-out should preferably be conducted by the method as disclosed in Japanese Unexamined Patent Publication No. 59(1984)-192240. Specifically, in this method, preliminary read-out for approximately ascertaining the image input information of a radiation image recorded on a stimulable phosphor sheet is conducted by use of stimulating rays having an energy level lower than the energy level of stimulating rays used in final read-out prior to the final read-out for reproducing a visible image used for viewing, particularly for diagnostic purposes. The read-out gain in the final read-out is adjusted and/or the image processing is conducted based on the preliminary read-out information. In this case, the preliminary read-out means and the final read-out means may be used independently, or may be constituted by a single means. At the image read-out section 30 of the aforesaid embodiments, the preliminary read-out may be conducted by conveying the stimulable phosphor sheet 5 by the endless belt 31 in the sub-scanning direction as indicated by the arrow D, the sheet 5 is returned to the read-out position reversely to the arrow D, and the final read-out may then be conducted by conveying the sheet 5 in the sub-scanning direction as indicated by the arrow D. Or, the preliminary read-out may be conducted during sheet conveyance in the sub-scanning direction as indicated by the arrow D, and the final read-out may be conducted during sheet conveyance in the sub-scanning direction reverse to the arrow D.

I claim:

1. A radiation image recording and read-out apparatus comprising:

(i) a sheet storing section for storing a plurality of stimulable phosphor sheets capable of recording a radiation image thereon, (ii) an image recording section for recording a radiation image on each of said stimulable phosphor sheets by exposing said stimulable phosphor sheet to a radiation carrying image information, (iii) an image read-out section provided with a stimulating ray source for emitting stimulating rays for scanning said stimulable phosphor sheet carrying said radiation image recorded thereon at said image recording section, and a photoelectric read-out means for detecting light emitted by said stimulable phosphor sheet scanned with said stimulating rays to obtain an electric image signal, (iv) an erasing section for having said stimulable phosphor sheet release the radiation energy remaining on said stimulable phosphor sheet prior to the next image recording on said stimulable phosphor sheet for which the image read-out has been conducted at said image read-out section, and (v) a sheet conveyance means provided with a sheet holding mechanism for holding said stimulable phosphor sheet transferably with respect to said sheet storing section, said image recording section, said image read-out section, and said erasing section, said sheet conveyance means moving said sheet holding mechanism in an arbitrary sequence among said sections.

2. An apparatus as defined in claim 1 wherein said sheet storing section comprises a plurality of rack plates on which said stimulable phosphor sheets are respectively placed.

3. An apparatus as defined in claim 1 wherein said sheet conveyance means comprises a vertical screw rod, a motor for rotating said vertical screw rod, a vertically moveable base having a nut section meshed with said vertical screw rod, a horizontal screw rod rotatably supported on said vertically moveable base, a motor for rotating said horizontal screw rod, and said sheet holding mechanism having a nut section meshed with said horizontal screw rod.

4. An apparatus as defined in claim 3 wherein said vertical screw rod is positioned on the lateral side with respect to said sheet storing section, said image recording section, said image read-out section, and said erasing section.

5. An apparatus as defined in claim 3 wherein said sheet holding mechanism comprises a first rotary solenoid secured to said nut section, a holding plate secured to a rotation shaft of the first rotary solenoid, a second rotary solenoid mounted on said holding plate, and an arm secured to a rotation shaft of said second rotary solenoid.

6. An apparatus as defined in claim 3 wherein said sheet holding mechanism comprises a holding plate secured to said nut section, a rotary solenoid mounted on said holding plate, and an arm secured to a rotation shaft of said rotary solenoid.

* * * * *